July 10, 1928.
E. F. W. ALEXANDERSON
1,676,312
SYSTEM OF ELECTRIC SHIP PROPULSION
Filed Oct. 16, 1922
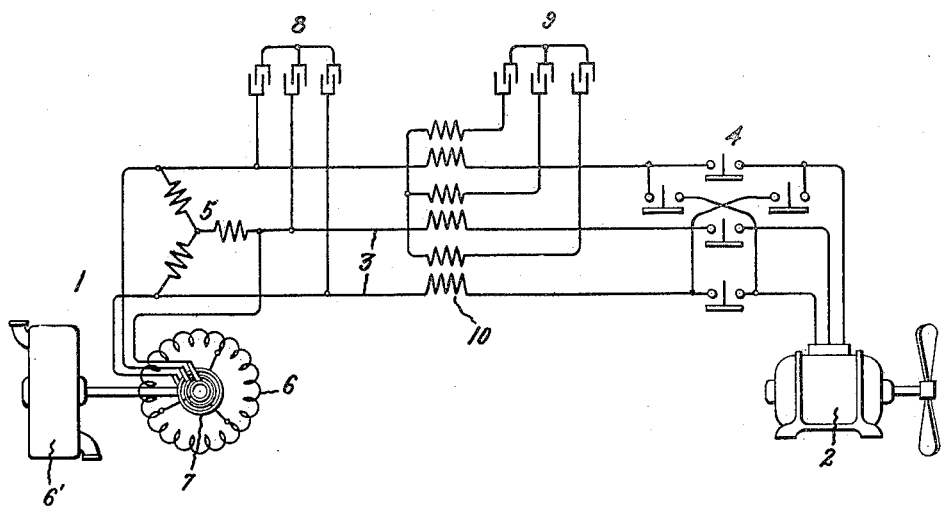
Inventor:
Ernst F. W. Alexanderson,
by *Alexander S. Lunt*
His Attorney.

Patented July 10, 1928.

1,676,312

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF ELECTRIC SHIP PROPULSION.

Application filed October 16, 1922. Serial No. 594,754.

My invention relates to systems of ship propulsion and more particularly to an improvement in systems of electric ship propulsion which comprises a steam turbine, or other prime mover, mechanically coupled to a generator designed to supply energy to one or more propeller motors.

In operating prior systems of this character certain difficulties have been encountered by reason of the fact that the electrical equipment used has not been designed to maintain the most desirable relation between the speed of the steam turbine and that of the ship's propeller, each of which operates most efficiently at a more or less definite speed.

In the case of the ordinary merchant ship, for example, it has been found that the propeller is most efficient when designed to operate at a speed in the neighborhood of 100 R. P. M. A 3000 H. P. turbine, such as is commonly used on ships of this character, operates most efficiently at a speed of about 6000 R. P. M., and, in order to secure the most desirable operation of both the turbine and the propeller, it is necessary to provide means for reducing the speed in the ratio of about 60 to 1.

The speed at which an alternating dynamo electric machine must be operated is determined largely by the frequency of the system to which it is connected and by the number of poles on the machine. If a frequency of 60 cycles per second be assumed and the machine is bipolar, it must obviously be operated at a speed of 3600 R. P. M. The maximum speed attainable with the ordinary alternating current generator on a 60 cycle system is, therefore, much below the speed at which the turbine to which it is connected operates most efficiently. For this reason the 3000 H. P. turbine used on small merchant ships has been handicapped by its high steam consumption when operated at the comparatively low speed at which it must be run when used in connection with ordinary generators and motors for electric drive. It is therefore the principal object of my invention to provide means by which the turbine and propeller speeds may be so related as to secure the best possible efficiency for the entire system. It is a further object of my invention to provide improved exciting means designed to make the operation of the system as a whole and particularly that of the generator more simple and satisfactory. Other objects and advantages will appear as my invention is considered in detail.

Referring more particularly to the drawing, there is diagrammatically shown in the single figure thereof a preferred embodiment of my invention in which a polyphase generator 1, designed to supply energy to the propelling motor 2 or other load device through the polyphase line 3 and the reversing switch 4, is provided with polyphase stator and rotor windings 5 and 6 respectively which are connected in parallel with each other to the line 3, the connections to the rotor windings being made through the slip rings 7 which, together with the rotor windings 6, are mechanically fixed to the rotating member of a steam turbine or other prime mover 6'. The prime mover 6' may be operated at variable speed to control the speed of the propeller motor 2. Condensers 8 and 9, connected in shunt and series respectively with the polyphase line 3, are used to supply the excitation required for the proper operation of the generator 1 and function in much the same manner as when used to excite the well known induction generator. A series transformer 10 may be used to step up the voltage applied to the condensers. If the line voltage is sufficiently high the condensers may be designed to be connected directly in series without the current transformers.

The switch 4 is provided for the purpose of reversing the driving direction of the propelling motor as occasion may require.

The generator 1 is known as a double synchronous machine because it is driven at double the speed at which its stator field rotates. This generator is a development of the polyphase induction motor with wound secondary, possesses all the advantages of this motor with respect to the mechanical and electrical construction and, in cases where a high ratio of speed reduction is desirable, as in the case of electric ship propulsion for example, it possesses the further advantage that, in order to deliver current of a given frequency, its speed may be double that of the ordinary alternating current generator. In order that this fact may be easily understood, certain features of the machine will be considered briefly in detail.

If the stator and rotor windings of the machine be disconnected and a rotating field be produced in the machine, in any suitable manner as by a three phase exciting winding placed on either the stator or rotor, for example, there will be induced in the stator and rotor windings voltages having the same frequency and phase sequence, and, if the two members of the machine are provided with the same number of turns and are similar in other respects, the two windings may be connected in parallel so long as the rotor remains stationary. If the rotor be turned in the same direction as that in which the assumed exciting field rotates, the frequency of the voltage induced in the rotor winding will gradually decrease and will become zero when the rotor speed is equal to that of the field. A further increase in the rotor speed will cause the rotor conductors to cut the assumed exciting field in the opposite direction. and there will now be induced in these conductors a voltage the frequency of which will increase until the rotor speed is double that at which the assumed exciting field rotates when the frequency and value of the induced stator and rotor voltages will again become equal.

The conditions now existing differ from those at standstill in two respects. The relation between the directions in which the stator and rotor currents tend to flow has been reversed, and the voltages induced in the stator and rotor windings are now of opposite phase sequence. If the two windings are to be connected in parallel it is now necessary to interchange two of the leads of one of the windings in order to reverse its phase sequence and to turn one of the windings through an angle of 180° for the purpose of establishing the proper relation between the rotor and stator currents. With these alterations in the connections made, it is now clear that the two windings may be connected in parallel, and that if means are provided for furnishing the exciting field required to supply the iron and inductive losses the machine may be driven to deliver current from each of the parallel connected windings and at a speed which is double that of the ordinary alternating current generator when operated to deliver current of the same frequency.

The excitation of the generator 1 may be supplied in any one of a number of ways. As previously indicated, it is possible to excite the machine by a third polyphase winding wound on the stator of the machine. Such a construction, however, would be unduly expensive. If the generator be connected in parallel with a direct current excited synchronous dynamo electric machine such as the propeller motor, for example, its operation is similar to that of the ordinary induction generator in that it will derive the necessary exciting current from the synchronous machine and special provision for its excitation will be unnecessary. I prefer to excite the generator by the use of static condensers connected to the line on which the generator is to operate, such use being new in so far as I am aware. I propose to use these condensers in such a way that they will give a leading power factor of the proper value at all loads. The condensers will thus be utilized not only to excite the generator but may supply any leading current that may be necessary to the proper operation of the propelling motor.

The use of the condensers in both shunt and series connection has the advantage in the first place that it balances all reactance at all loads and gives a combination of high overload capacity. It has also the advantage that approximately correct power factor is maintained over a fairly large range of frequencies. If the speed is reduced, the shunt condensers will become less effective in producing leading power factor, but the series condensers will become more active to this end and the two effects will combine to render the system operative over a sufficiently large range of speed for practical purposes.

In operating the system, the speed of the propeller motor is controlled by varying the speed of the prime mover. Either an induction or a synchronous machine may be used to drive the propeller. An induction motor is incapable of supplying the excitation required by the generator, but, if of the polyphase type, has the advantage that it may be brought up to speed without special provisions for starting. The synchronous motor, unlike the induction motor, ordinarily requires special means for starting but may be used to supply the necessary excitation current for the generator. While the series and parallel connected condensers will not be essential to the operation of the system after the motor is in operation, in case a synchronous motor is used, it may be found desirable to retain them in the circuit for the purpose of relieving the motor of the extra burden incident to supplying exciting current for the generator and for automatically correcting the power factor of the system.

While I have specifically described certain features of construction and methods of operation, it will be obvious to those skilled in the art that many modifications and variations are possible, and I intend, therefore, to cover all such modifications and variations as fall within the scope of my invention which is defined in the appended claims.

What I claim as new and desire to secure by Letters Patent of the United States, is,—

1. An electric ship propulsion system comprising a double synchronous generator, static condensers designed to excite said generator and connected in series therewith, and a motor arranged to drive a propeller.

2. An electric ship propulsion system comprising a double synchronous generator, a motor arranged to drive a propeller, means for connecting said motor to said generator, exciting means for said generator connected in parallel therewith, and additional exciting means for said generator connected in series therewith between said generator and said motor.

3. A system of ship propulsion comprising a double synchronous generator, a motor arranged to drive a propeller, means for connecting said motor to said generator, static condensers designed to excite said generator and connected in parallel therewith, and additional exciting means for said generator connected in series therewith between said generator and said motor.

4. An electric system of distribution comprising a double synchronous generator, static condensers designed to excite said generator and connected in series therewith, and additional static condensers designed to excite said generator and connected in parallel therewith.

5. An alternating current system of distribution comprising a variable speed generator, an inductive load, static condensers connected in series with said load, and additional static condensers connected in parallel with said load, said condensers being designed to excite said generator and correct the power factor of the system.

In witness whereof, I have hereunto set my hand this 14th day of October, 1922.

ERNST F. W. ALEXANDERSON.